Oct. 14, 1958            C. E. BERRY            2,856,468

NEGATIVE FEEDBACK AMPLIFIER IN A MEASURING SYSTEM

Filed Oct. 27, 1952            2 Sheets-Sheet 1

INVENTOR.
CLIFFORD E. BERRY

BY

ATTORNEY

Oct. 14, 1958 C. E. BERRY 2,856,468
NEGATIVE FEEDBACK AMPLIFIER IN A MEASURING SYSTEM
Filed Oct. 27, 1952 2 Sheets-Sheet 2
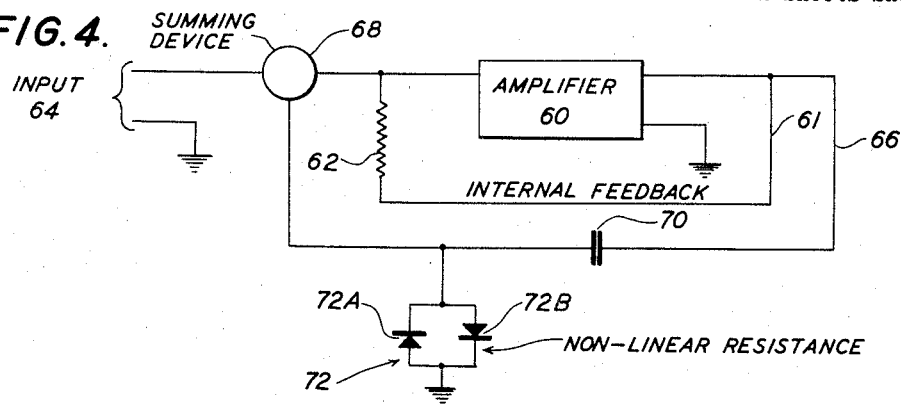
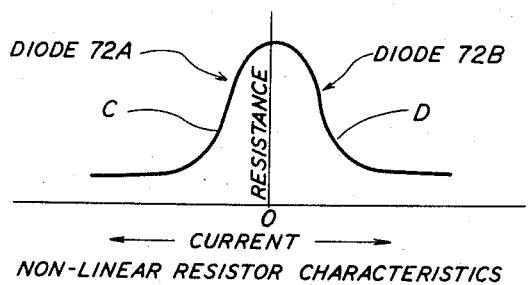
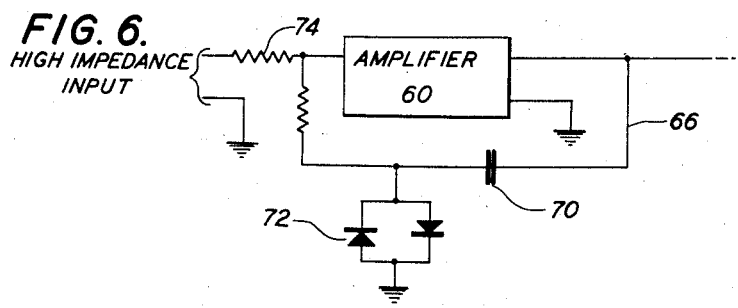
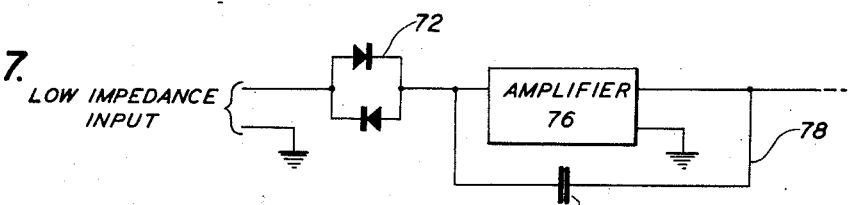
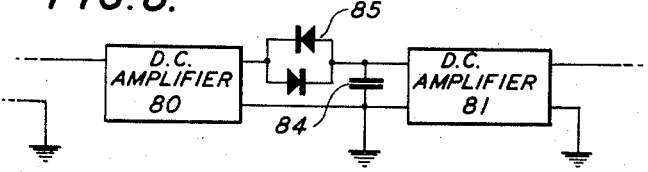
INVENTOR.
CLIFFORD E. BERRY
BY
ATTORNEY

United States Patent Office 2,856,468
Patented Oct. 14, 1958

2,856,468
NEGATIVE FEEDBACK AMPLIFIER IN A MEASURING SYSTEM

Clifford E. Berry, Altadena, Calif., assignor, by mesne assignments, to Consolidated Electrodynamics Corporation, Pasadena, Calif., a corporation of California Application October 27, 1952, Serial No. 317,105

2 Claims. (Cl. 179—171)

This invention relates to electrical measuring systems and particularly to such systems finding use under circumstances in which the signals to be measured are essentially constant in the region of interest but which change rapidly from one significant value to another.

The measuring system associated with a mass spectrometer exemplifies the situation with which the invention is concerned. In such application successive peak signal values, obtained upon scanning different ion masses, are significant, whereas transient intervals are of little interest.

In sensitive measuring systems the random noise level is a limiting factor in the precision of measurement. At the same time it is well known that the noise level is a direct function of the band width, or otherwise expressed, in inverse function of the time constant of the measuring system. Theoretically, therefore, the noise level may be reduced to any desired value by the expedient of increasing the time constant. Any increase in time constant, however, results in a corresponding decrease in the rate at which readings can be made. Heretofore it has been necessary in any such system to compromise between the allowable noise level and the allowable time in which a reading must be obtained.

The present invention is directed to circuitry enabling an increase in the rate of obtaining readings with a given niose level, or, conversely, providing a lower noise level for a given rate of reading. This is accomplished in the disclosed circuitry by varying the time constant of the measuring system as an inverse function of the rate at which the signal to be measured is changing. The circuit then operates in such a fashion that when the signal is changing rapidly the time constant is small, allowing the measuring system to follow the rapid signal change. It follows that during this period of rapid signal change the noise level is high. In the type of system under consideration this does not represent a disadvantage since the transient periods are of no interest. When the signal is changing slowly or not at all, i. e. when it is at or immediately adjacent a significant value, the time constant is made large by the disclosed circuit and the noise level is low so that precise readings can be made. Even though the system is slow to respond to changes in this condition, the changes to which it must respond are small enough that negligible error due to the lag will be introduced.

To accomplish the foregoing objectives, the invention contemplates in a system for measuring an electrical signal and including amplification means for amplifying the signal, the combination comprising means operable to vary the time constant of the system as an inverse function of variation in the rate of change of the signal. Preferably variation of the time constant is not only inversely related to signal variation but is also made responsive to such variation in the rate of change of the signal.

The manner of accomplishing this variation in time constant as an inverse function of the rate of change of the signal may take the form of a non-linear network connected in the grid circuit of one amplification stage of the measuring system. In this regard a feedback loop connected to the grid leak resistor is considered as being a portion of the grid circuit. Such a non-linear network may take the form of a resistance-capacitance (RC) filter comprising a resistor and capacitor connected respectively in series and in parallel in the grid circuit with means for shorting out either the resistor or capacitor during periods of rapid signal change. Alternatively, a non-linear resistor may be connected in the grid circuit as in the input lead or in the feedback loop of one amplification stage of the system.

The system of the invention is not designed for use in measuring systems in which a continuous signal changing at varying rates is to be measured at any instant in time because of the fact that the noise level is unduly high during periods of rapid signal change and because its dynamical response is non-linear. Rather, it is adapted to such systems as the recordation of mass spectra, as mentioned above, where it is desired to measure the amplitudes of a sequence of signals which are essentially flat top pulses and where no information regarding the sides of the pulses is needed. It is also adapted to systems in which a series of quasi-steady signals of differing amplitude are sequentially switched into a single measuring device.

The invention will be more clearly understood by reference to the following detailed description thereof as taken in conjunction with the accompanying drawings, in which:

Fig. 4 is a circuit diagram of a measuring system showing another form of non-linear network in accordance with the invention as associated with a feedback loop;

Fig. 5 is a graph showing the characteristics of a portion of the non-linear network of Fig. 4;

Fig. 6 is a circuit diagram of a specific embodiment of the circuit of Fig. 4;

Fig. 7 is a circuit diagram of another embodiment of the invention specifically adapted to low impedance input; and Fig. 8 is a circuit diagram of a modification of the circuit illustrated in Fig. 3.

Figure 1:
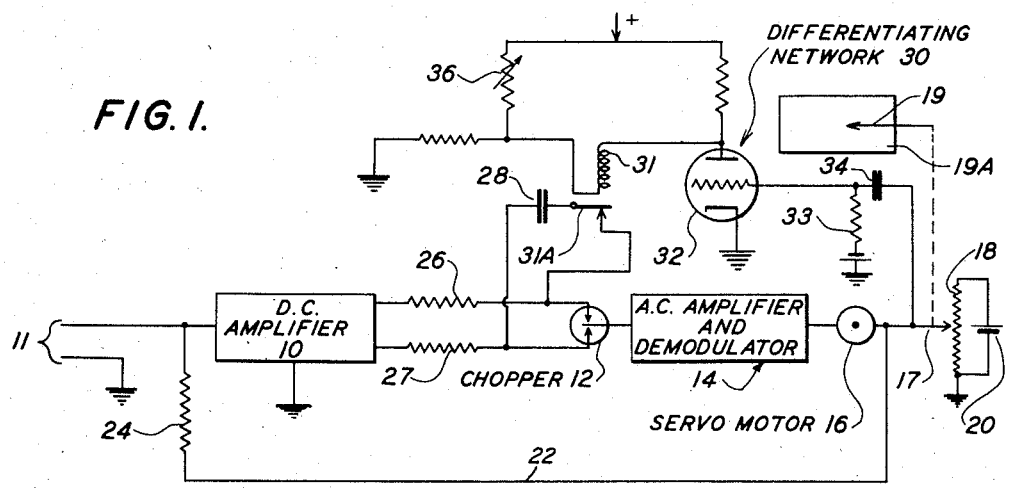
Fig. 1 is a circuit diagram of one embodiment of the invention as incorporated in a typical null type, self-balancing network.

The circuit shown in Fig. 1 is in part a conventional self-balancing potentiometer network including a D. C. amplifier 10 to which an input signal is applied at 11. The output of the amplifier is connected to a chopper 12, the output of which is applied to an A. C. amplifier and demodulator combination 14. The output of the A. C. amplifier (as appearing when the circuit is unbalanced) is connected to drive a servo motor 16 which in turn manipulates tap 17 of a potentiometer 18 across which a determined voltage is applied from a source 20. A recording pen 19 is connected to plot the excursions of potentiometer tap 17 on a strip chart 19A. The voltage tapped off by tap 17 is applied through a feedback loop 22 connected through grid leak resistor 24 to the D. C. amplifier 10. In operation any signal appearing at the output of the D. C. amplifier 10 is modulated in the chopper 12 and applied as an A. C. component to amplifier 14. The output of the A. C. amplifier drives servomotor 16 to set potentiometer 18 to a point at which the input to the D. C. amplifier is balanced to extinguish the unbalance output thereof. Hence at static conditions, i. e. during periods of no signal change, there will be no voltage across the chopper 12, the system remaining in null balance in such periods.

In accordance with the invention an RC filter network is incorporated between the D. C. amplifier 10 and chopper 12, i. e. in the grid circuit of amplifier 14, and comprises serially connected resistors 26, 27 in the output leads of the amplifier 10 and a parallel coupled capacitor 28 connected between the output leads of the amplifier. This RC filter is made to operate as a non-linear network by switching the capacitor out of the circuit whenever the rate of change of the signal input exceeds a predetermined value. When the capacitor is in the circuit the time constant is long and the noise low, and, conversely, when the capacitor is out of the circuit the time constant is short and the noise high.

In systems in which signals are introduced on a programmed basis the capaictor may be switched in and out of the circuit on a time basis and as a part of the programming. However, where such a program is not employed, it is desirable to provide automatic means for accomplishing this same function, such means being illustrated in the application as a differentiating network 30 connected to energize a relay 31 including a switch 31A in series with the capacitor 28. The differentiating network includes a triode 32, the grid of which is connected to a grid leak resistor 33 and through a capacitor 34 to the potentiometer tap 17 whereby the tube 34 is responsive to rapid changes in signal at the tap 17. The plate circuit of tube 32 is connected across the relay 31 and is balanced by a serially connected variable resistor 36 to energize the relay 31 at any predetermined signal level on the grid of tube 32.

Figure 2:
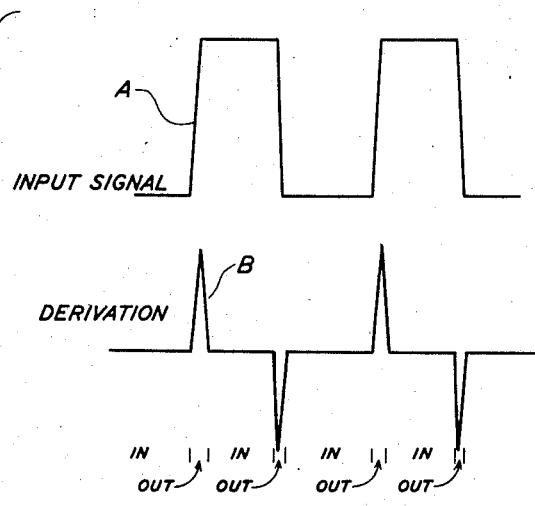
Fig. 2 is a graphic portrayal of the response of a portion of the apparatus of Fig. 1 as a function of the character of input signal.

The operation of the circuit may be explained in relation to the diagram of Fig. 2 in which curve A represents a typical pulse type input signal which may be derived, for example, from the collector electrode of a mass spectrometer and applied at input 11 of the apparatus of Fig. 1. The plate-bridge circuit of the differentiating network 30 is balanced by adjustment of resistor 36 so that no current flows with zero signal to the grid of tube 32. When a step function is applied to the differentiating network at capacitor 34, a transient current is established in the grid resistor 33. The resultant grid signal induces current flow in the plate circuit actuating relay 31. The derivation of the step function as developed in the network 30 is illustrated in curve B of Fig. 2.

During periods of constant signal amplitude as represented by the peaks and bases respectively of the pulses illustrated in curve A, the differentiating circuit has no output and the capacitor remains connected across the chopper 12. During these periods the system has a low noise level and a high time constant. During periods of rapid signal change as existing in the sides of the peaks of curve A, the differentiating circuit responds thereto as above described and as illustrated by curve B in Fig. 2, during which periods relay 31 is energized to short capacitor 28 out of the circuit. During these intervals the circuit has a low time constant and high noise level, the latter characteristic being not objectionable in this circumstance since the peak values of the curve A are the significant values.

Figure 3:
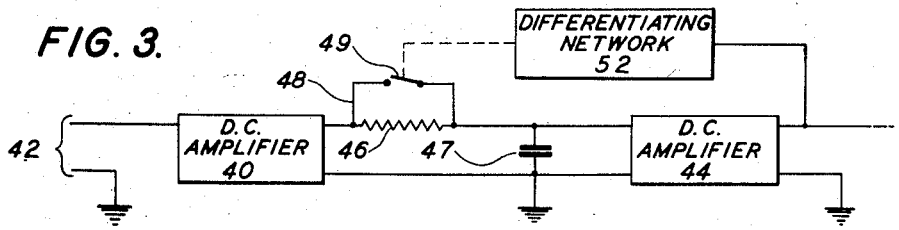
Fig. 3 is a modification of the circuitry of Fig. 1 as employed in a strictly D. C. amplification system.

As mentioned above, the null balance system of Fig. 1 is characterized by the property that regardless of the signal level there is essentially no signal at the chopper during periods when the signal is not changing. This enables the capacitor to be switched in and out of the circuit as described without having to be charged or discharged and without the consequent transients which would otherwise be set up. The system shown in Fig. 3 is distinguished from that of Fig. 1 in that there is no point in the circuit at which the potential is zero when the rate of change of signal is zero. Hence, it is not practical to achieve non-linear response in the manner illustrated in Fig. 1.

The circuit of Fig. 3 comprises a D. C. amplifier 40 to which a signal is applied at input 42 and the output of which is applied to a second D. C. amplifier 44, the output of this amplifier being susceptible to measurement or recordation in conventional manner. In actuality, the amplifiers 40 and 44 are merely two stages of a single amplification system and are illustrated as separate amplifiers only for purposes of convenience. As in the foregoing embodiment, an RC filter is connected between first and second amplifiers and comprises a serially connected resistor 46 and a parallel connected capacitor 47. A shunt connection 48 including a switch 49 is connected across the resistor 46. The differentiating network 52, which may be the same as the network 30 of Fig. 1, is connected to the output of the second amplification stage 44 and to the switch 49 to actuate the switch responsive to differentiation of the output of the amplifier 44. In this circuit the differentiating network is responsive to rapid signal changes as appearing at the output of amplifier 44 to close switch 49 shorting out resistor 46 to achieve the desired short time constant during such periods of signal change. Conversely, as the signal reaches a stable value, switch 49 is opened so that during such periods of stability the system is characterized by a low noise level and a high time constant.

The circuit of Fig. 4 illustrates a different method of obtaining non-linear response independent of the use of a differentiating network. This circuit comprises an amplifier 60 which may include several amplification stages and internal feedback as represented schematically by the loop 61 connected to the input of amplifier 60 through a grid leak resistor 62. The signal to be measured is applied at amplifier input 64. The non-linear network in accordance with the invention comprises a second feedback loop 66 connected between the output of amplifier 60 and a conventional summing circuit 68 in the amplifier input. The feedback loop 66 includes a serially connected capacitor 70 and a parallel coupled non-linear resistance 72.

In this instance the non-linear resistance is represented by a pair of parallel coupled diodes 72A, 72B connected back to back. The resistance characteristics of the diodes 72A, 72B and of the non-linear resistor 72 comprising the parallel coupled diodes is shown in the diagram of Fig. 5 wherein resistance is plotted against current. In Fig. 5 curve C shows the variation in resistance of diode 72A with increase in current and curve D shows the variation in resistance of diode 72B, the characteristics of the two diodes being complementary to result in a resistance of non-linear characteristics.

As a general proposition feedback tends to linearize non-linear elements, the degree of such linearization being a function of the magnitude of the feedback. This relationship is taken advantage of in the present invention by incorporating a non-linear network including the capacitor and resistance network 72 in the feedback loop. In this arrangement the significant signal is that appearing across the non-linear resistor rather than that appearing across the capacitor. During transient perids, i. e. during periods of rapid signal change of the input 64, the resistance of the non-linear resistor 72 will be low because of the high charging current required by capacitor 70, and the feedback signal applied at the summing circuit 68 will be correspondingly small so that the noise level will be high and the time constant of the system low, as desired. Conversely, during periods of comparatively static signal amplitude the resistance of the network 72 will be high since the blocking condenser 70 will block the D. C. components of the amplifier output and the feedback will be small. The converse situation will thus prevail during periods of small or no signal change, i. e. the system will have a high time constant and a low noise level.

Fig. 6 is a specific modification of the system of Fig. 4 specifically adapted to a high impedance input. A serially connected resistor 74 in the input to amplifier 60 serves as the summing device shown schematically at 68 in Fig. 4. Resistor 74 functions to average the high impedance input and the feedback enabling the application of the high impedance input and feedback signal to the amplifier tube.

Fig. 7 shows a modification of the system of Fig. 4 particularly designed for a low input impedance circuit. In this instance the non-linear resistance element 72 is incorporated in the input lead of the system amplifier 76, the capacitor 70 being in feedback loop 78 of the amplifier 76. The effect of the non-linear resistance 72 and the capacitor 70 in the low impedance network is the same as above described.

Figs. 4, 6 and 7 show various embodiments of the invention employing a non-linear resistor as a portion of the combined nonlinear network and as eliminating the need for a differentiating circuit as illustrated in Figs. 1 and 3. A specific form of non-linear resistance in the nature of parallel coupled diodes is illustrated in each of these figures. However, it is obvious that any form of non-linear resistor may be used in the manner shown, the only requirement being that its resistance decrease with an increase in current.

In addition a non-linear resistor, such as the back to back coupled diodes of the resistor 72 (Fig. 4), may be used in the RC filter network of Figs. 1 and 2 to eliminate the need of a differentiating network. Fig. 8 shows such a modification of the circuit of Fig. 2 including amplification stages 80, 81 interconnected through an RC filter comprising parallel coupled capacitor 84 and serially coupled non-linear resistor 85. The response of the non-linear resistor to changes in current flow approximates the effects of shunting resistor 46 (Fig. 2) responsive to the differential of the step function under investigation and to the same effect.

I claim:

1. In a pulse amplitude measuring system for amplifying a sequence of flat top pulses, the combination which comprises a D. C. amplifier including D. C. input and output circuits and a feedback circuit coupling said input and output circuits, a resistor connected in series in the amplifier input and a resistor connected in series in the feedback circuit and to the amplifier input to form an adding network for input and feedback signals to the amplifier, said feedback circuit including a capacitor in series and a non-linear impedance in shunt in the feedback circuit path, said capacitor and non-linear impedance having a short time constant substantially less than the pulses in response to the rapid rate of change in amplitude of the flat top pulses to decrease the feedback and time constant of the amplifier during the rapid changes in amplitude.

2. In a pulse amplitude measuring system for amplifying a sequence of flat top pulses, the combination which comprises a D. C. amplifier including D. C. input and output circuits and a feedback circuit coupling said input and output circuits, a resistor connected in series in the amplifier input and a resistor connected in series in the feedback circuit and to the amplifier input to form an adding network for input and feedback signals to the amplifier, said feedback circuit including a capacitor in series and a symmetrical non-linear impedance in shunt in the feedback circuit path, said capacitor and non-linear impedance having a short time constant substantially less than the pulses in response to the rapid rate of change in amplitude of the flat top pulses to decrease the feedback and time constant of the amplifier during the rapid changes in amplitude.

References Cited in the file of this patent

UNITED STATES PATENTS

| | | |
|---|---|---|
| 2,215,777 | Benz | Sept. 24, 1940 |
| 2,513,454 | Couillard | July 4, 1950 |
| 2,556,070 | De Groote et al. | June 5, 1951 |
| 2,607,528 | McWhirter et al. | Aug. 19, 1952 |
| 2,681,952 | Gilbert | June 22, 1954 |

FOREIGN PATENTS

| | | |
|---|---|---|
| 629,260 | Great Britain | Sept. 15, 1949 |